May 18, 1948.  J. B. McFADDEN  2,441,711
APPARATUS FOR HOMOGENIZING MIXED LIQUID INGREDIENTS
Filed March 27, 1945  2 Sheets-Sheet 1
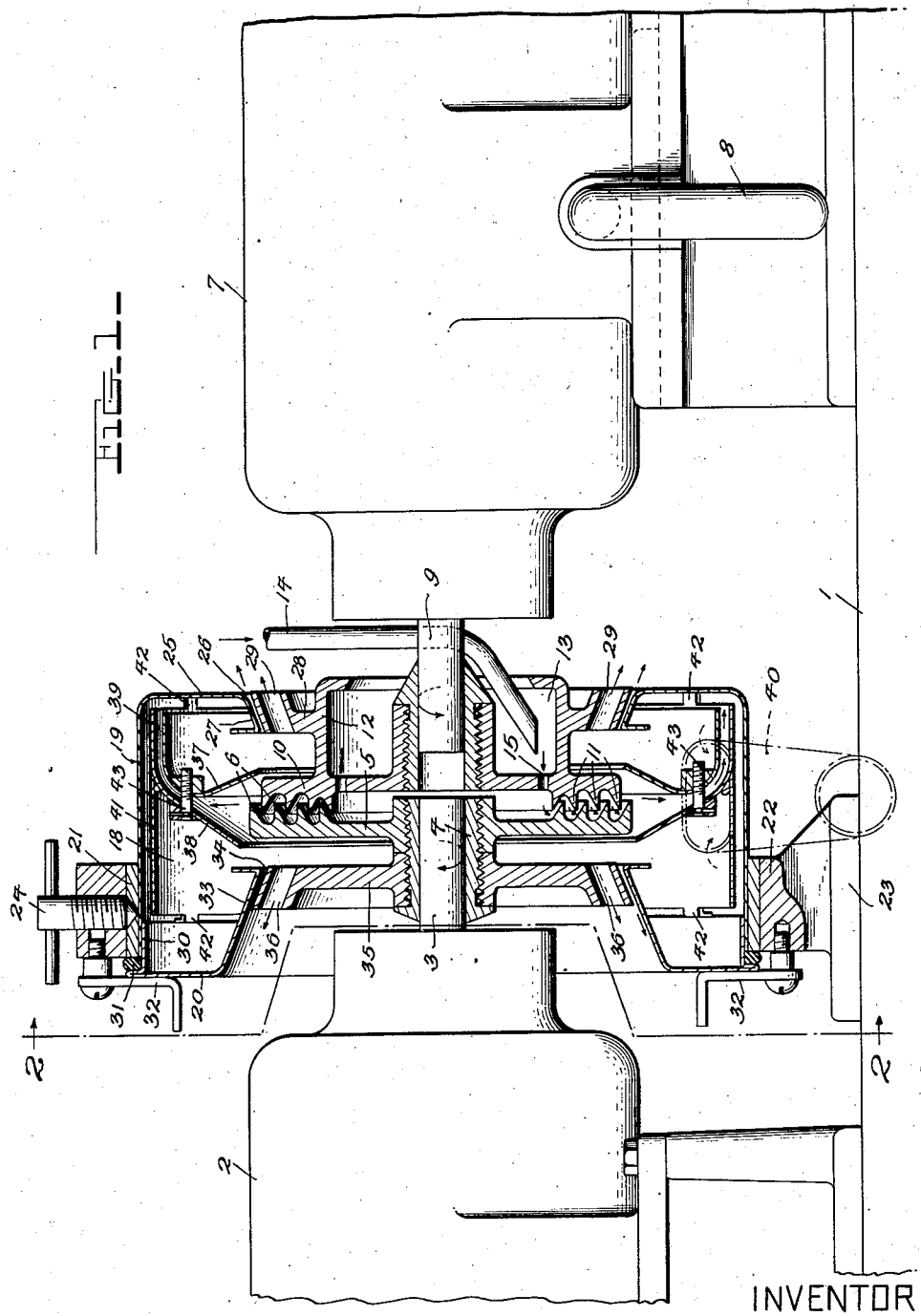
INVENTOR
James B. McFadden
By Mason, Porter & Diller
Attys.

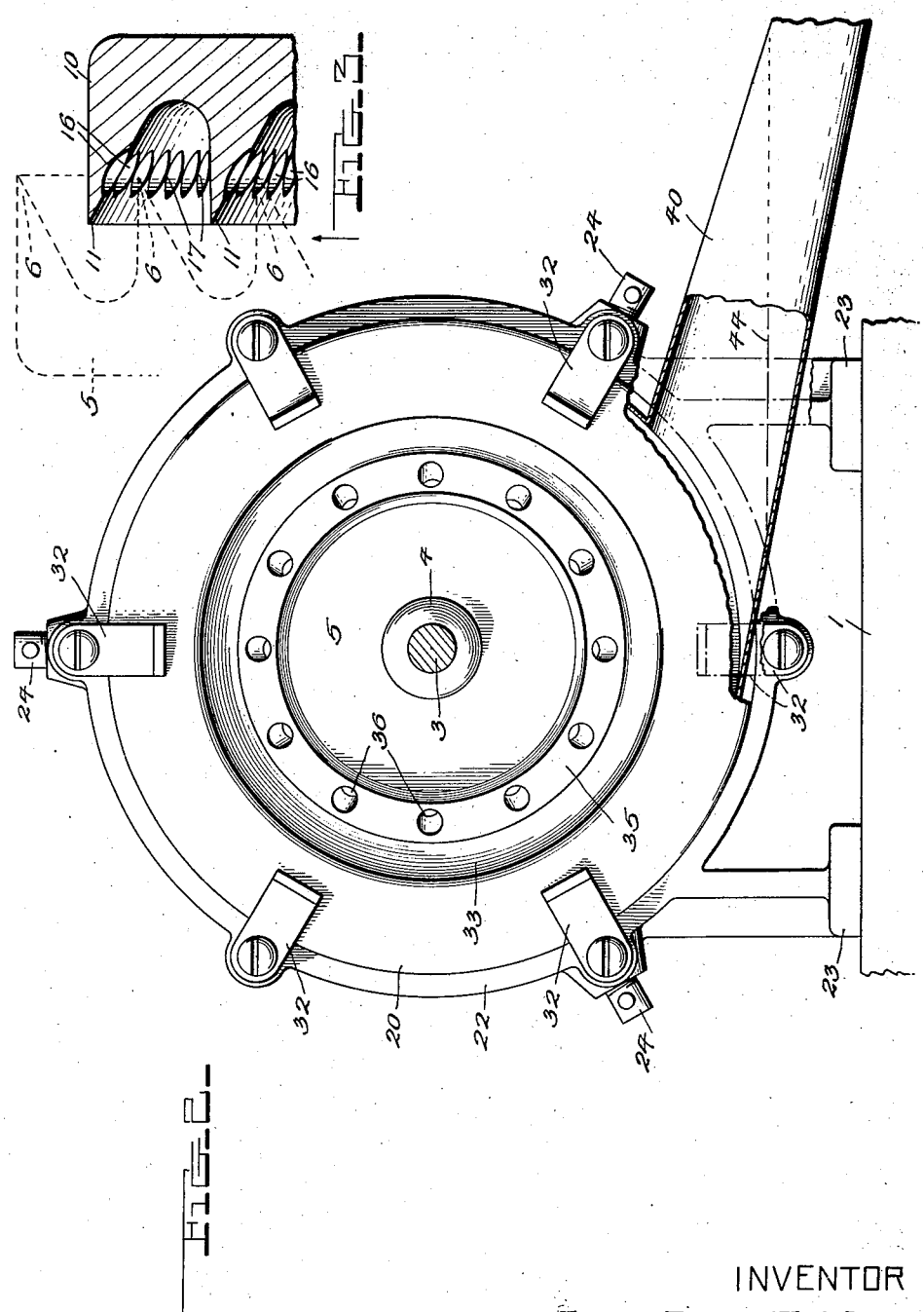

Patented May 18, 1948

2,441,711

UNITED STATES PATENT OFFICE 2,441,711

APPARATUS FOR HOMOGENIZING MIXED LIQUID INGREDIENTS

James B. McFadden, West Chester, Pa., assignor to United Dairy Equipment Company, West Chester, Pa., a corporation of Pennsylvania Application March 27, 1945, Serial No. 585,114

3 Claims. (Cl. 259—8)

The invention relates to new and useful improvements in an apparatus for homogenizing mixed liquid ingredients containing oily substances.

An object of the invention is to provide an apparatus of the above type wherein the oily globules of the mixed ingredients will be efficiently broken and torn into smaller globules so as to produce a stable homogenized product.

Another object of the invention is to provide an apparatus of the above type wherein the ingredients are broken and torn by being impacted against blades rotating in opposite directions.

A further object of the invention is to provide an apparatus of the above type wherein the rotating blades are provided with sharp edges and so spaced that the oily globules are released from the sharp edges of the blades in succession and impacted against the next adjacent blade.

A still further object of the invention is to provide an apparatus of the above type wherein the faces against which the ingredients are impacted have shallow pockets disposed relative to each other so as to provide sharp edges for rupturing oily globules.

These and other objects will in part be obvious and will in part be hereinafter more fully disclosed.

In the drawings—

Figure 1 is a view partly in front elevation and partly in section showing an apparatus embodying the improvements;

Figure 2 is an end view of the same with parts broken away to show the arrangement of the delivery spout;

Figure 3 is an enlarged detail in section through one of the disks supporting the blades and showing the pockets in the inner face of the blades and also showing in broken lines the relative position of the blades on the opposed disks.

The apparatus as shown in the drawings includes a supporting base 1 on which a motor 2 is mounted in a fixed position thereon. The shaft 3 of the motor carries a sleeve 4 which is splined thereto, and mounted on this sleeve 4 is a disk 5 which rotates with the shaft. This disk 5 is provided with a series of radially spaced blades 6, 6. These blades are of successively larger diameter. Each blade as shown in the drawings, has the inner face thereof inclined and the outer face substantially at right angles to the plane of rotation of the disk.

Also mounted on the supporting base is a motor 7. Said motor is adjustably mounted so that it may be moved in an axial direction and is secured in adjusted positions by a lock lever 8 of the usual construction. The motor 7 has an extended shaft 9 on which is mounted a disk 10 having a series of radially spaced blades 11, 11. These radially spaced blades on the disk 10 are shaped similar to the blades on the disk 5. They are disposed, however, so that the blades 11 lie between the blades 6 on the opposed disk. The disks are disposed relative to each other so that the end portions of the blades overlap in a radial direction.

It is noted that there will be a separate motor for each disk and these motors are so actuated that the disks rotate in opposite directions. As illustrated, the motor shafts rotate about horizontal axes. It will be understood, however, that from certain aspects of the invention they may be otherwise disposed.

The disk 10 is provided with a laterally projecting housing 12 which provides a receiver 13 into which the ingredients to be homogenized are fed. As shown, the ingredients pass from a suitable mixer through a pipe 14 and are discharged into the receiver at the lower side thereof. The disk is provided with a plurality of circumferentially spaced openings 15. The ingredients discharged from the pipe into the receiver will pass through these openings to the inner face of the disk 10.

A centrifugal force acting on the ingredients, due to the fact that the housing 12 rotates with the disk, will cause the ingredients to pass through the openings 15 and thence outwardly across the blades on the opposed disks. The openings 15 are so dimensioned that the flow channel between the blades is of greater capacity than these outlet openings 15, and therefore the mixed ingredients will flow in film form along the inner face of a blade and be released from the cutting edge of the blade and then impacted against the next adjacent blade. As these oily globules pass over this sharp edge of the blades, they will be cut, torn and shaved into smaller globules. On the next outer blade there will be further cutting, tearing and shaving of the globules until when they are finally released from the outermost blades they will be very small so as to produce a very stable homogenized product.

As shown in Figure 3, the inner face of each blade is provided with a series of pockets 16. These pockets are disposed back from the cutting edge of the blades in which they are formed and a plane containing the sharp edges of the opposed blades will intersect the pockets so that when the mixed ingredients are released from a sharp cutting edge they will be impacted against this pocket area of the next succeeding or surrounding blade. These pockets, as shown, are so close that they provide therebetween cutting edges 17.

As the oily globules strike these cutting edges which separate the pockets and which surround the pockets, they will be further cut, torn and broken into smaller globules. Furthermore, the globules passing into the pockets and forming into a film which moves outwardly on the inner face of the blade will be caused to rotate with the blade due to this increased frictional grip of the wall of the blade on the flowing film. This ensures that the film when released from the sharp edge of the blade, will be moving at the same speed of the blade and will be impacted against the inner surface of the next adjacent blade which is rotating in an opposite direction. The fact that the adjacent blades are rotating in opposite directions greatly increases the rupturing action of the blades on the mixed ingredients. The ingredients will be thrown in a tangential direction from one blade against the pocketed surface of the blade rotating at a similar speed in the opposite direction.

As the mixed ingredients leave the rotating blades they are discharged into a casing 18. This casing is formed by a sheet metal annular body portion 19 and a cover portion 20. The body portion is reinforced by a metal ring 21 which surrounds the same adjacent its open end. This ring is clamped in an annular frame 22 mounted on a bracket base 23. The body member 19 is held in place in the annular frame by set screws 24. As shown, there are three of these set screws arranged in such angular relation to each other that the body member 19 will be firmly clamped to the frame.

The body member 19 has an inwardly extending portion 25 provided with an opening 26. The portion 25 is turned inwardly so as to form a wall 27 which surrounds this opening. Disposed in this opening 26 is a disk-shaped member 28 which is formed integral with the housing 12. This disk-shaped member has a series of spaced ports 29 located adjacent the periphery thereof. These ports incline outwardly of the axis of rotation and serve as a centrifugal pump for drawing the air out of the chamber within the casing 18.

The cover 20 is provided with an annular flange 30 which fits within the body member 19. A gasket 31 is clamped between a projection on the cover and the ring 21 so that the cover is sealed to the body member 19. Clamping members 32 carried by the annular frame 22 serve to hold the cover in sealed contact with the body member 19.

The cover has an inwardly extending portion 33 which provides an opening 34 in which is located a disk 35. This disk 35 has a threaded connection with the sleeve 4 and rotates with the sleeve and the disk 5. Said disk 35 is provided with a series of circumferentially spaced ports 36 which incline outwardly and serve as an additional means for drawing the air from the casing 18. These disks rotating rapidly will prevent any air from entering the openings 26 and 34 in which the disks rotate. The casing 18 is thus placed under vacuum.

The ingredients as they are impacted against the blades tend to foam and the purpose of this vacuum on the chamber 18 is to eliminate to a great extent this foam from the homogenized product. The foam is formed by the gases and the entrapped air and the pressure in each little foam bubble is at atmospheric pressure. When the foam is discharged into this chamber which is under vacuum, the differential pressure existing on the inner and outer surface of the bubble will cause the bubble to expand until it bursts.

The homogenized product is discharged by centrifugal force between two annular decks 37 and 38 which are shaped so as to provide a relatively narrow discharge throat 39 through which the ingredients pass into the body member 19 and from the body member the homogenized products pass out through a spout 40. The deck member 38 is carried by a cylindrical portion 41 which is provided with lugs or feet 42, 42 which will hold the cylindrical portion spaced away from the inner surface of the body member 19. It is understood, of course, that this casing including the body member 19 and these decks are all stationary and do not rotate.

The deck 37 is supported by bolts 43 which may be utilized for adjusting the position of these decks relative to each other. The purpose of the narrow throat of the decks is to squeeze the homogenized products so as to eliminate to a further extent air trapped therein. This discharge of the homogenized ingredients into a rarified atmosphere and between opposed decks for eliminating trapped air forms no part of the present invention, but is shown, described and claimed in my copending application Serial No. 583,161, filed March 16, 1945.

It will be noted from Figure 2 that the discharge spout 40 is so dimensioned that the homogenized ingredients passing out through the spout will close the lower end of the spout so that the chamber 18 may be placed under vacuum. The discharge end of the spout may have a suitable means for restricting the flow so that the level of the discharge product will at least be somewhere in the vicinity of the broken line 44 (Figure 2).

It is thought that the operation of the homogenizing apparatus will be clear from the description given. Generally, it may be stated that the mixed ingredients, after they have been properly mixed, are discharged from the pipe 14 into the receiving chamber 13 and from the receiving chamber the mixed ingredients are caused to flow in continuous small streams in between the rotating disks where they will form in a fine film and be impacted against one blade after another on the rotating disks. The oily particles passing over the sharp edges of these blades in succession will be torn, shaved and ruptured into smaller globules. The little pockets with the sharp edges in the face of the blade against which the ingredients are impacted not only further cut and tear the oily globules, but they cause the film to rotate at the speed of the blade against which they are impacted, and thus the oily particles are broken into very fine globules and the mixed ingredients thus reduced to a very stable homogenized product.

The apparatus can be very easily disassembled so as to give access to the inner parts for the cleaning of the same. The cover 20 can be quickly removed and then the body member 19 can be withdrawn from the annular frame supporting the same after the set screws have been released. The withdrawal of the body member 19 takes place at the same time the motor 7 and the parts supported thereby are moved away from the disk 5. The deck members can be removed from the body member 19 and the body member 19 also removed as the diameter of the opening 26 is slightly larger than the diameter of the disk 10. Not only are the parts easily accessible for cleaning, but by the shifting of the motor the position of the blades on the disk 10 relative to the blades on the disk 5 can be adjusted.

It is obvious that many changes in the details of construction and the arrangement of the parts may be made without departing from the spirit of the invention as set forth in the appended claims.

I claim:

1. A homogenizer comprising a casing, a disk mounted for rotation in said casing, a second disk mounted for rotation in said casing in an opposite direction, said disks having radially spaced concentric projecting blades disposed so that the blades on one disk lie between the blades on the other disk with the end portions of the blades overlapping in a radial direction, a receiver mounted on one of said disks for rotation therewith, means for directing mixed ingredients into said receiver, said disk carrying the receiver having openings leading therefrom to the inner face of the disk and disposed radially inward of said blades whereby the mixed ingredients discharged from said openings will be moved outwardly by centrifugal force and impacted against one blade after another, each blade having a sharp cutting edge and a series of pockets on their inner faces disposed so that the pockets of the respective blades lie in the same plane as the sharp edges of said blades and ingredients released from the sharp edge of one blade are impacted against the pocketed area of the next outer blade.

2. A homogenizer comprising a casing, a disk mounted for rotation in said casing, a second disk opposed to said first-named disk, said disks having radially spaced concentric projecting blades disposed so that the blades on one disk lie between the blades on the other disk with the end portions of the blades overlapping in a radial direction, each of said blades having a frusto-coniform impact surface terminating peripherally in a sharp continuous cutting edge, each said impact surface having a series of pockets recessed therein and disposed in the same plane as the next inward sharp blade edge so that the ingredients released from the sharp edge of one blade are impacted against the pocketed area of the next outer blade, and means for directing the mixed ingredients onto said blades so that said ingredients will be moved outwardly over said blades by centrifugal force.

3. A homogenizer comprising a casing, a disk mounted for rotation in said casing, a second disk opposed to said first-named disk, said disks having radially spaced concentric projecting blades disposed so that the blades on one disk lie between the blades on the other disk with the end portions of the blades overlapping in a radial direction, each of said blades having a frusto-coniform impact surface terminating peripherally in a sharp continuous cutting edge, each said impact surface having a series of pockets recessed therein, said pockets being disposed in the same plane as the next inward sharp blade edge and close together so that their adjacent faces terminate in sharp cutting edges whereby the ingredients released from the sharp edge of one blade are impacted against the sharp cutting edges in the pocketed area of the next outer blade, and means for directing the mixed ingredients onto said blades so that said ingredients will move outwardly over said blades by centrifugal force.

JAMES B. McFADDEN.

REFERENCES CITED

The following references are of record in the file of this patent:

UNITED STATES PATENTS

| Number | Name | Date |
| --- | --- | --- |
| 1,496,641 | Hurrell | June 3, 1924 |
| 1,624,037 | Butler | Apr. 12, 1927 |
| 1,666,640 | Cuniff | Apr. 17, 1928 |
| 1,696,083 | Fraser | Dec. 18, 1929 |
| 1,728,178 | Eppenback | Sept. 17, 1929 |
| 2,260,834 | Everett | Oct. 28, 1941 |

FOREIGN PATENTS

| Number | Country | Date |
| --- | --- | --- |
| 88,221 | Sweden | Jan. 5, 1937 |